United States Patent [19]

Hube et al.

[11] Patent Number: 5,442,541
[45] Date of Patent: Aug. 15, 1995

[54] ENABLING FEATURES OVER COMMON COMMUNICATION CHANNEL

[75] Inventors: Randall R. Hube, Rochester; Louis J. Cardinale, Webster; Christopher J. Auclair, Fairport, all of N.Y.; Theodore W. Thomas, Olympia, Wash.

[73] Assignee: Xerox Corporation, Stamford, Conn.

[21] Appl. No.: 94,949

[22] Filed: Jul. 23, 1993

[51] Int. Cl.6 .................................................. G05B 15/02
[52] U.S. Cl. ..................................... 364/138; 364/188; 355/204
[58] Field of Search ........................... 364/133–138, 364/146, 188–192; 395/101, 650, 155–161; 355/205, 202, 204

[56] References Cited

U.S. PATENT DOCUMENTS

| 4,498,130 | 2/1985 | Uchida | 364/188 |
| 4,639,881 | 1/1987 | Zingher | 364/188 |
| 4,658,093 | 4/1987 | Hellman | 380/25 |
| 4,888,798 | 12/1989 | Earnest | 380/4 |
| 4,999,806 | 3/1991 | Chernow et al. | 364/900 |
| 5,077,660 | 12/1991 | Haines et al. | 364/464.02 |
| 5,084,875 | 1/1992 | Weinberger et al. | 355/205 |
| 5,214,772 | 5/1993 | Weinberger et al. | 355/202 |
| 5,224,207 | 6/1993 | Filion et al. | 395/101 |
| 5,276,875 | 1/1994 | Satoh | 395/650 |
| 5,282,127 | 1/1994 | Mii | 364/138 |

Primary Examiner—James P. Trammell
Attorney, Agent, or Firm—Ronald F. Chapuran

[57] ABSTRACT

A technique for downloading or activating or deactivating selected machine features from a remote central station that is connected to the remote machine by a communication channel. Also, the invention includes identifying features to be downloaded and then activated at a given site and communicating the data relative to the identified features to the remote machine.

15 Claims, 9 Drawing Sheets

ENABLING FEATURES OVER COMMON COMMUNICATION CHANNEL

BACKGROUND OF THE INVENTION

The invention relates to a system for the selective enablement of machine features and more particularly, to the selective enablement of machine features from a remote station over a common communication channel.

A significant consideration in the use of an imaging machine is that some features of the machine may not be appropriate to every location or machine environment. In addition operator experience and the mix of job requirements may or may not preclude the use of selected machine features. Yet, it is impractical to tailor a machine configuration specifically for each distinct machine location. As a result, a machine generally is designed or embedded with a multitude of features that may or may not be applicable at certain locations. For example, features such as Document Editing, Set Addressing, Poster Enlargement, Irregular Enlargement, Auto Center, Mirror Image, Freehand editing, Merge Image, User Registered Colors, Bi-directional image shift, Book Copying or even Expanded Finishing capability may not always be required by the customer. For customer relations, it is preferable, to charge a customer only for features that are applicable to the specific customer requirements. Yet, the machine often already possesses these features or such features may be requested at a later date.

To overcome the above identified difficulties, it would be desirable to provide a more flexible and adaptable machine, in particular, a more flexible and adaptable machine that selectively provides features commensurate with specific locations and customer requirements.

It is known in the prior art, for example, D/91198, U.S. Ser. No. 07/812,341 for screen dialogues related to features embedded in a machine to be selectively installed in the machine from a a portable memory device to enable the features for operator use. An operator loads the portable memory device into the machine for reading by the machine control and a special dialog frame on the interface screen is displayed prompting the operator to confirm the installation of selected screen dialogues. The selected screen dialogues are automatically set in the control NVM to establish the selected screen dialog within the machine. It is also known to be able to enable various software packages in a machine control by making appropriate entries in non volatile memory.

The difficulty with the prior art, however, is the required intervention of an operator or service representative to load and install the feature and to make the appropriate changes in the non volatile memory to reconfigure the machine. This also requires handling a portable memory and decisions and actions at the machine site that may be incorrect or inappropriate for the specific location. In addition, if the machine does not already contain a given software feature, the feature must be first preloaded into the machine control before it can be enabled or made available to the operator. This usually requires the service of a tech rep and further complicates configuring a machine. It would be desirable, therefore, to eliminate a costly call by a service representative or the reliance on a machine operator to enable or dis-enable selected machine functions, let alone to retro fit the feature into the machine for the first time.

Other prior art includes U.S. Pat. No. 4,658,093 to Hellman disclosing a software distribution system wherein software can be authorized for use solely by a particular base unit and for only a specific number of times. A manufacture of base units and software generates a random key and stores it in a base unit which is sold to a user. When wishing to use a certain software package, the user's base unit generates a random number and communicates it to the manufacturer of the software. The software manufacturer generates an authenticator which is a cryptographic function of the base unit's key, the software, the number of times use of the software is authorized, and the random number generated by the base unit. The user's base unit then uses the same cryptographic function to generate a check value of the key, the software, the number of times use is authorized, and the random number which the base unit generated. If the check value and the authenticator agree, the base unit accepts the authenticator as valid and increments the number of times of use for which the software is authorized.

U.S. Pat. No. 4,888,798 to Earnest discloses a method and apparatus that permits identical copies of encrypted computer software (including a number of software elements) to be distributed to many users while retaining central control over which elements are authorized for use by each user.*

U.S. Pat. No. 4,999,806 to Chernow et al. discloses a software distribution system wherein a central station distributes software by telephone. After receiving a request for purchasing software from a purchaser, the central station transmits a Control Transfer Program and Initialization Program to the purchaser computer, and the purchaser executes the Initialization Program to turn over control of the purchaser computer to the central station. Subsequently, the Control Transfer Program is executed to transfer first a Protection Program for ensuring that no memory resident copying programs are running, and then a Storing Program is executed for modifying the purchased program for storage at the purchaser computer. Finally, the purchased program is transmitted to the purchaser computer and stored there. During the Transaction, the various transmitted programs are erased, so that at the end of the transaction only a copy protected version of the purchased program remains on the purchasers disk. These systems, however, do not teach the selective enablement of machine features from a remote central station or the selective downloading and enablement of features from a remote station.

It is an object of the present invention, therefore, to provide a new and improved technique to simply and quickly adapt the features of a machine to the requirements of a predetermined location without operator or service representative on site presence. It is still another object of the present invention to selectively change the features of a machine by remote designation or feature downloading from a central control station over a common communication channel. Other advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with downloading or activating or deactivating selected machine features from a remote central station that is connected to the remote machine by a communication channel. Also, the invention includes identifying features to be downloaded and then activated at a given site and communicating the data relative to the identified features to the remote machine.

For a better understanding of the present invention, reference may be had to the accompanying drawings wherein the same reference numerals have been applied to like parts and wherein:

DETAILED DESCRIPTION OF THE DRAWINGS

Figure 2:
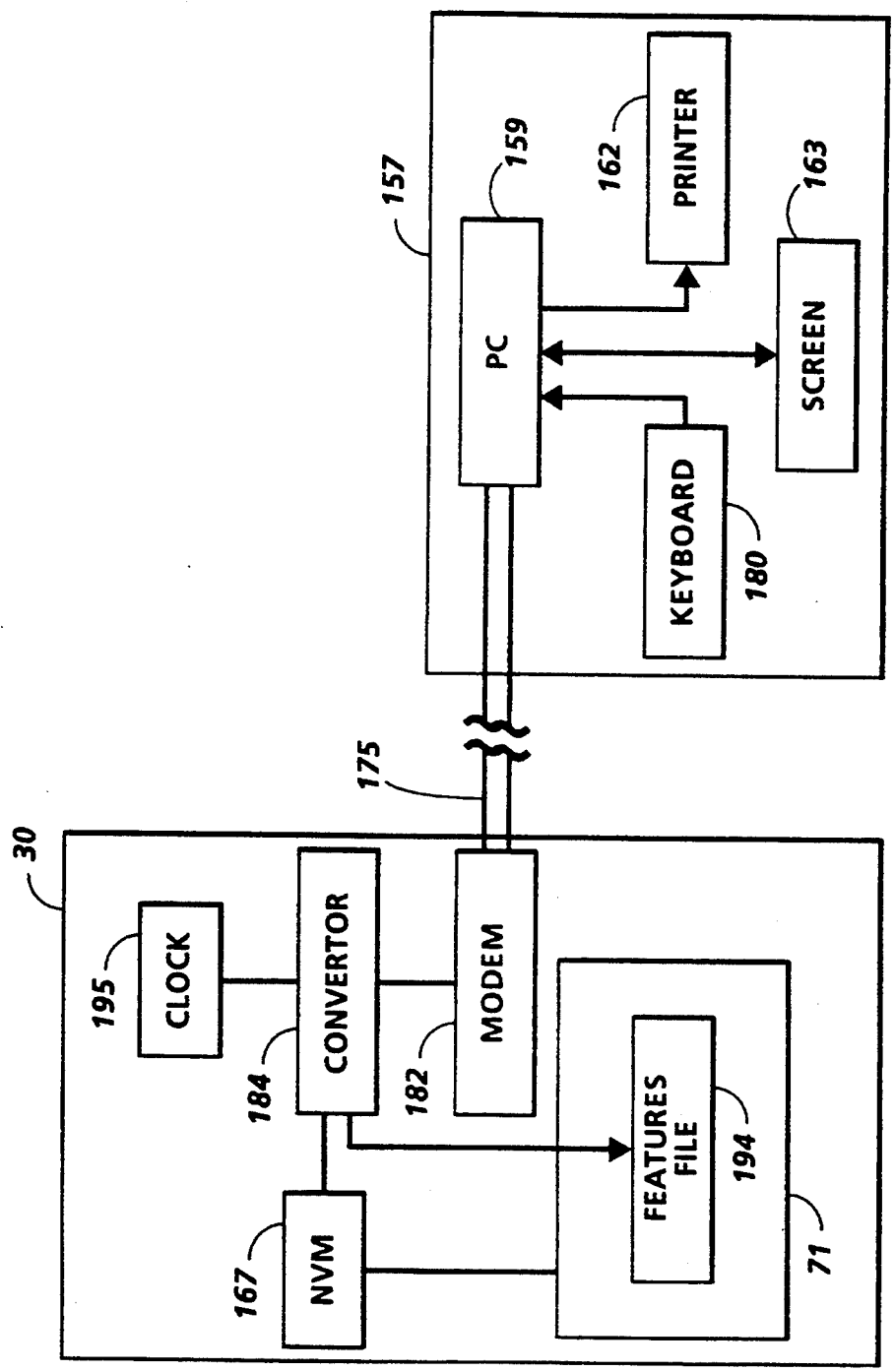
FIG. 2 is a general block diagram of the remote communication system incorporating the present invention.
Figure 6:
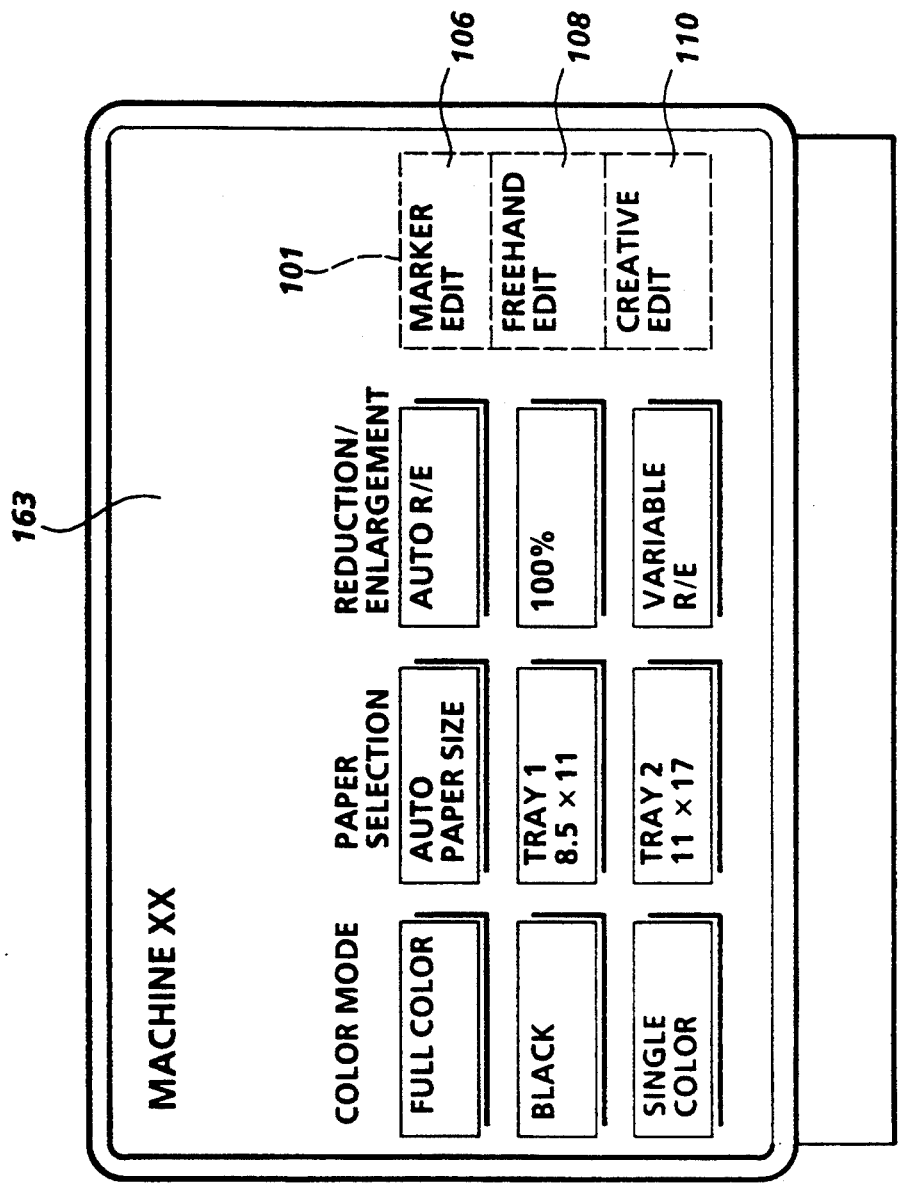
Figure 7:
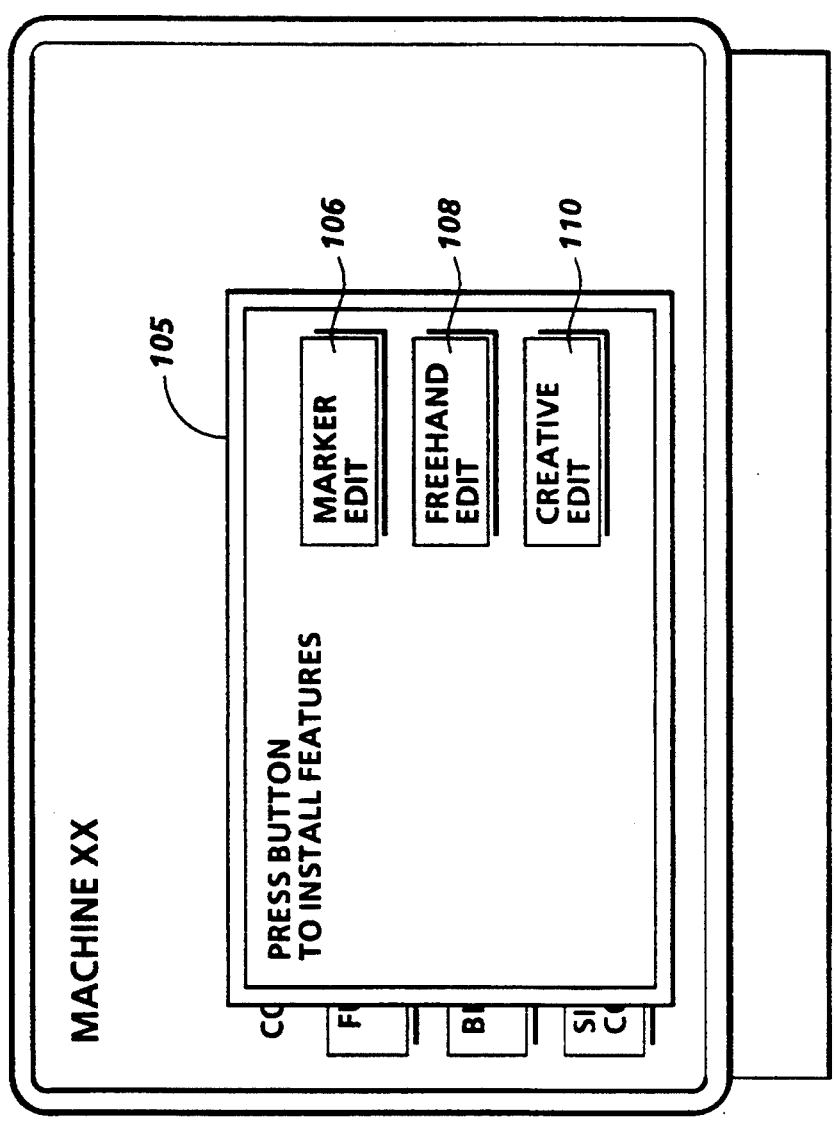
Figure 8:
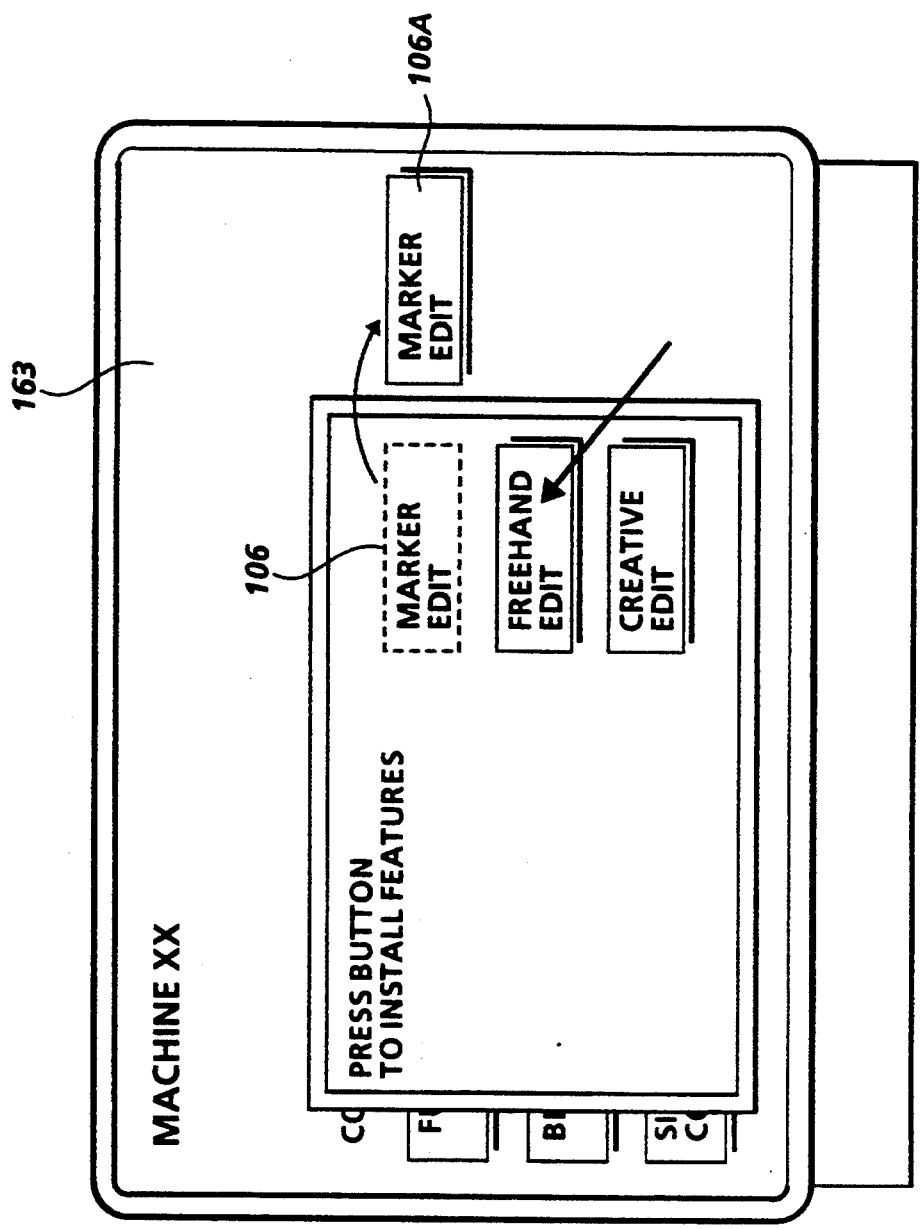
Figure 9:
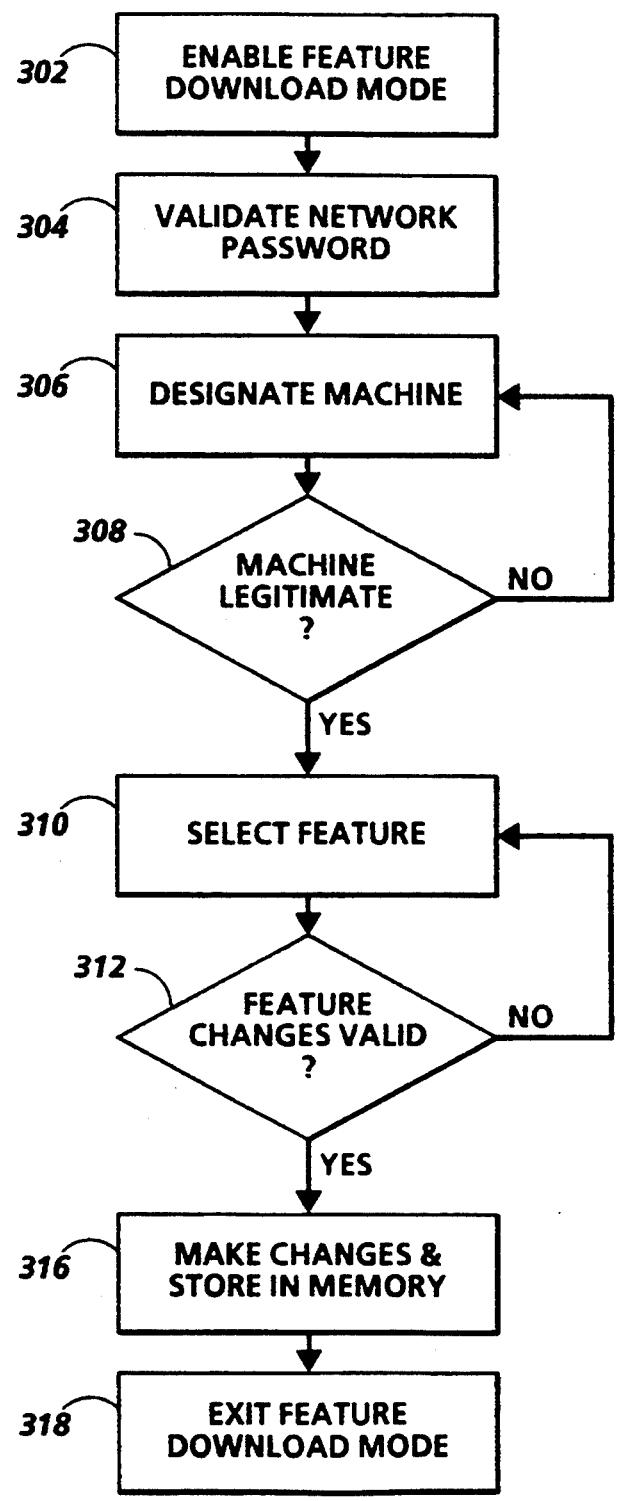

FIGS. 6-8 are front views of the touch monitor screen of the remote station of FIG. 2 depicting the remote transfer or enablement of selected machine feature from a central station to a remote machine in accordance with the present invention; and FIG. 9 is a flow chart depicting the remote transfer or enablement of selected machine features from a central station to a remote machine in accordance with the present invention.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DETAILED DESCRIPTION OF THE PREFERRED EMBODIMENT

For a general understanding of the features of the present invention, reference is made to the drawings. In the drawings, like reference numerals have been used throughout to identify identical elements.

Figure 1:
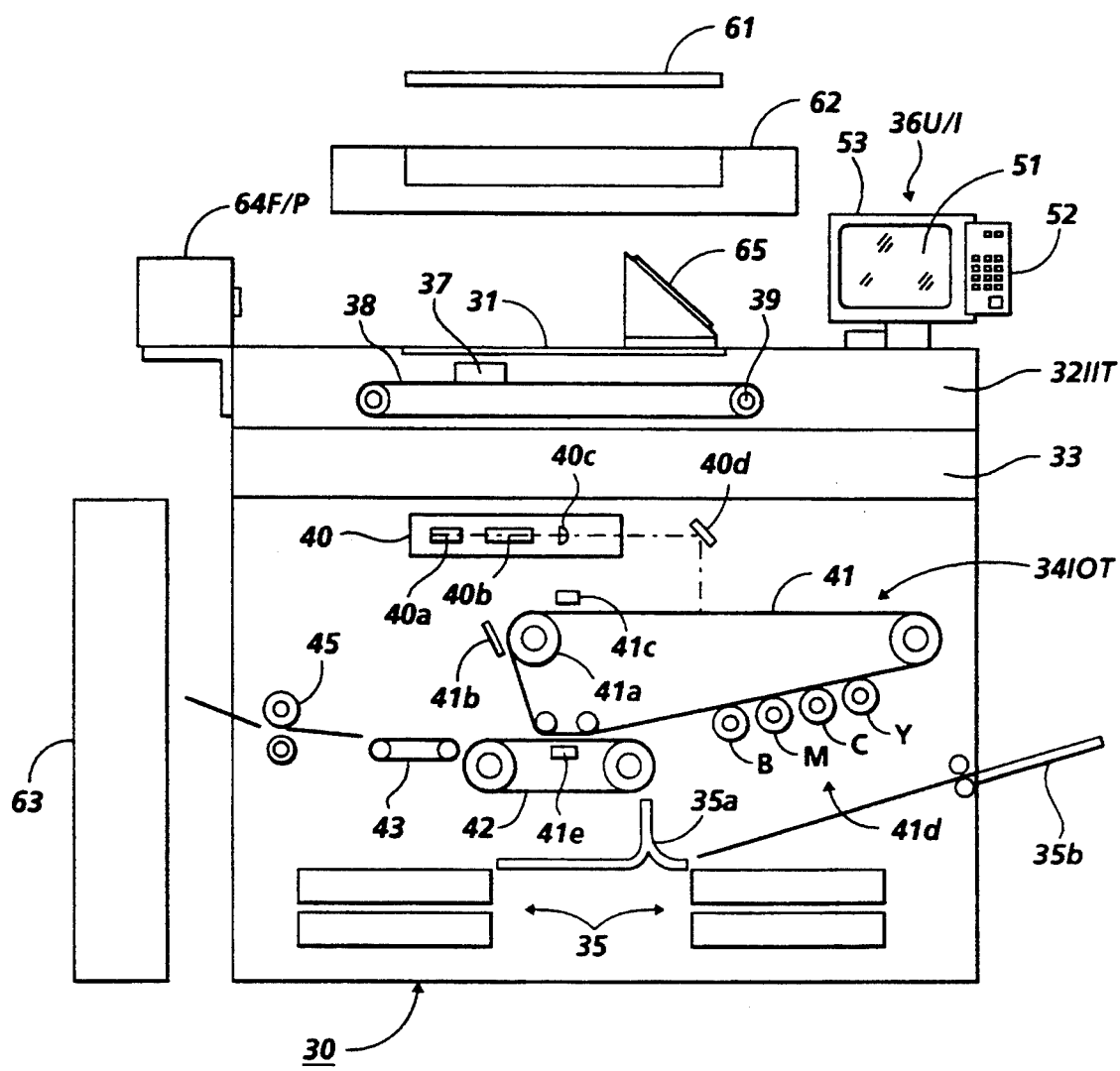
FIG. 1 is a schematic elevational view depicting various operating components and subsystems of a typical machine incorporating the present invention.

FIG. 1 shows one example of the overall construction of a color copying machine to which this Invention is applied. The color copying machine to which this Invention is applied is formed with the base machine 30, i.e. the basic constituent unit, which is composed of a platen glass plate 31, which carries the original sheet thereon, an image input terminal (IIT) 32, an electrical control system container 33, the image output terminal (IOT) 34, and a paper tray 35, and a user interface (U/I) 36 and also, as optional items, of an editing pad 61, an automatic document feeder (ADF) 62, a sorter 63, and a film projector (F/P) 64.

Electrical hardware is necessary for performing the control of the IIT, IOT, U/I, etc. mentioned above, and a plural number of boards for each of the processing units, such as the IIT, IPS, U/I, F/P, and so forth, which perform the image-forming process for the output signals from the IIT, and these are accommodated further in the electrical control system container 33, together with the SYS board for performing the control of these, and the MCB board (the Machine Control Board) for controlling the IOT, the ADF, the sorter, and so forth.

The IIT 32 is composed of an imaging unit 37, the wire 38 for driving the said unit, the driving pulley 39, and so forth, and IIT 32 reads a color original sheet for each of the primary colors B (Blue), G (Green), and R (Red) by means of a CCD line sensor and a color filter provided inside the imaging unit 37, converts the data so obtained into digital image signals and then outputs the signals to the IPS.

In the IPS, the B, G, and R signals mentioned above are transformed into the primary colors of the toner, i.e. Y(Yellow), C(Cyan), M(Magenta), and K(Black), and then, with various data processing being applied to the data so obtained for the purpose of enhancing the reproduction fidelity and fineness, and so forth, the IPS converts the toner signals of the process color in harmonious gradation into binary toner signals and outputs them to the IOT 34.

The IOT 34, which is provided with a scanner 40 and a photo-sensitive material belt 41, converts the image signals from the above-mentioned IPS into optical signals in the laster output part 40a and forms a latent image corresponding to the image on the original sheet on the photosensitive material belt 41 by way of the polygon mirror 40b, the f/-O lens 40c, and the reflexive mirror 40d. The photosensitive material belt 41, which is driven by the driving pulley 41a, has a cleaner 41b, a charging unit 41c, the individual developing devices for Y, M, C, and K, and a transfer device 41e arranged around it. And, opposite to this transfer device 41e is provided a transfer unit 42, which takes into it the sheet that comes transported to it from the paper tray 35 via the paper transport channel 35a and transfers the colors in the order of Y, M, C, and K, the transfer unit 42 being rotated four turns, for example, for full-color copying in four full colors. The sheet of paper on which the image is so transferred is then transported from the transfer unit 42 via the vacuum transport device 43 to the fixing device 45, where it is fixed, and is thereafter discharged from it. Moreover, the paper transport channel 35a is so designed as to accept the paper fed alternatively from the SSI (Single Sheet Inserter) 35b.

The U/136 is designed for use by the user for making the selections of the desired functions and for giving instructions regarding the conditions for the execution of the selected functions, and this system is provided with a color display unit 51 and a hardware control panel 52 installed by the side of the said display unit, and it is further combined with an infrared ray touch board 53, so that instructions can be given directly with the "soft buttons" on the screen.

Next, a description is made of the optional items for the base machine 30. One of them is the editing pad 61, which is an input device based on a system of coordinates and, when it is to be placed on the platen glass plate 31, permits the editing of various types of images by means of an input pen or a memory card. Moreover, the base machine 30 is so designed as to accept the installation of the existing ADF 62 and the existing sorter 63.

Furthermore, one of the features characteristic of this embodiment is the capability of the system to produce a color copy directly from color film, with a mirror unit (M/U) 65 mounted on the platen glass plate 31 and the film image being projected onto the said unit from the F/P 64, and the projected image being read as image signals by means of the imaging unit 37 of the IIT 32. The original sheet materials for this process are negative film, positive film, and slides, and this unit is provided with an automatic changing device for the rectifying filter.

This system has a major characteristic feature in its offer of a full automatic system covering the entire copying process from the inlet of copying work to the exit thereof while providing fully variegated and multifarious functions dealing adequately with the users needs and at the same time producing a system which everybody can operate with ease owing to such features as the selection of the functions, the selection of the executing conditions, and the display of other items on the menu, which are put on display on the CRT screen etc. in the user interface mentioned above.

A principal function of the system is in making it possible to make selection of the various kinds of functions by touching operations on the soft buttons on the primary screen, with operations performed on the hardware control panel for making the switching of start, stop, all clear, ten-key, interrupt, information, and language i.e. the factors which cannot be delimited in the operational flow. Also, the system permits full-color and black-and-white copying work with such simple operations that a copying machine embodying this invention can be used with the operating impression of the conventional copying machine, owing to the features permitting the selection of various types of editing functions, such as marker editing, business editing, and creative editing, by a touch on the pathway tab corresponding to the pathway representing the region for the selection of functions.

This equipment offers the functions of full-color copying in four colors as its major characteristic feature, and additionally it permits the selection of three-color copying and black-and-white copying. For the feeding of paper, this system permits automatic paper selection as well as the selection of a specified paper size. For reduction or enlargement, this equipment accepts the setting of magnification by one percent in the range from 50% to 400%, and also the equipment is provided with the function of differential magnification, which sets the vertical magnification and the horizontal magnification independently of each other, and the function for the automatic selection of magnification.

The copying density is determined by automatic density adjustment with respect to black-and-white original sheets. For color original sheets, the system performs automatic color balance adjustment, and for color balance, the system permits the operator to specify the color a reduction of which is to be desired in its reproduction on the copy. For the job program, the system permits the reading and writing of a job with a memory card, which can store eight jobs in the maximum. The memory capacity is 32 kilo bytes, and it is possible to perform the programming of the jobs other than those in the film projector mode.

Apart from these, the system is provided with such additional functions as copy output, copy sharpness, copy contrast, copy position, film projector, page programming, and margin. With the copy Output function, the selection of "Uncollated" while a sorter is attached as an optional item to the equipment sets the maximum adjustment function into operation, with the result that the set number of sheets is adjusted to fit within the maximum value of the sheets of paper that can be contained in the bin.

For the sharpness control function, by which the edges of the copied images are emphasized, provides such optional functions as manual sharpness control in seven steps as well as photograph sharpness control functions composed of photographs (Photo), characters (Character), mesh dot print (Print), mixture of photograph and characters (Photo/Character). These functions can be set voluntarily by default and by the tool pathway.

The contrast of copies can be voluntarily adjusted in seven steps by the operator, and the default can be set voluntarily by the tool pathway. The copy position function is the function for selecting the position where a copied image is to be placed on the paper, and, as an optional function, the system features the automatic centering function, which positions the center of the copied image in the center of the paper, and the default is automatic centering. The margin function makes it possible to set the margin by 1 mm within the range from 0 mm to 30 mm and this function is specifiable only for one side of one original sheet. The marking editing function is a function for performing editing and processing work in the area surrounded with markers.

This function is applicable to documents, and consequently the original sheets are treated as black-and-white original sheets, the images within the specified are being restored to the palette colors on the CRT and the areas other than the specified one being reversed in black on the copy. In the black and red mode, moreover, the image is changed into red while areas other than the specified area is rendered in black and red on the copy. This function is accompanied with the trimming, masking, color mesh, black to color functions. Furthermore, the specification of the area is done either by drawing a closed loop on the original sheet or by specifying the area by means of the editing pad. The same procedure applies also to the specifications of the area for processing in each of the editing functions mentioned hereinbelow. Additionally, the area so specified is displayed in an analogous figure in the bit map area on the CRT.

The trimming function works for copying only the images within the marked area in black-and-white rendition and to erase the images positioned outside the marked area. The color mesh function places a specified color mesh dot pattern in the marked area and reproduces the image in black and white on the copy, with the color of the said mesh being selected out of the eight standard colors (the specified colors as determined in advance) or out of the eight registered colors (the colors registered by the user; a maximum of eight colors can be registered at the same time out of 1,670 available colors), and a mesh pattern can be selected out of four patterns.

The business editing function aims at quickly producing high-quality original documents mainly for business documents, and the original sheet is treated as a full-color original sheet, for which it is necessary to specify the area or the point with respect to all the functions and for which a plural number of functions can be set for each original sheet. And, in the black and mono-color mode, the areas other than the specified one are reproduced in the form a mono-color copy while the image in black in the specified area is converted into the palette color on the CRT. In the black-and-red mode, moreover, the areas other than the specified one are rendered in black-and-red copy while the image in the specified area is converted into a red color. And, in addition to the trimming, masking, color mesh, and black-to-color functions available for marker editing, the functions of logotype, line, paint 1, collection, and function clear are provided.

The logotype function is the function which makes it possible to insert a logogram or logograms, such as a symbol mark, at a point or points specified therefor, and this function makes it possible to place two types of logograms in a vertical position and a lateral position respectively. However, only one such logogram can be set up for each original sheet, and the logogram patterns are prepared for the individual customers and supplied in a ROM.

The line function offers the function of drawing a vertical line or a horizontal line in relationship to the axis X by marking two points for such a line, and the color of such a line can be selected for each such line out of the eight standard colors and the eight registered colors, the number of specifiable lines being unlimited and the number of usable colors in seven colors in the maximum at any given time.

The paint 1 function performs the function of painting the overall area within a closed loop in any color selected for each such loop out of the eight standard colors or the eight registered colors, one point within a closed loop being specified therefor. The mesh function permits the selection of any mesh out of the four patterns for each area, the number of the specifiable loops being unlimited and the number of the usable color mesh patterns being seven patterns in the maximum.

The correcting function possesses the area/point change mode, by which the function set for each area can be ascertained and modified, the are/point correction mode, by which the area size and the position of the point can be changed by 1 mm, and the area/point canceling mode, by which the specified area can be ascertained, modified, changed, or erased.

The creative editing function contains the functions of image compositions, copy-on-copy, color composition, partial image shifting, multiple-page enlargement, paint 1, color mesh, color conversion, negative/positive reversal, repeat, paint 2, density control, color balance, copy contrast, copy sharpness, color mode, trimming, masking mirror image, margin, line, shift, logotype, split scanning, correction, function clear, and add function. In this function, the original sheets are treated as color original sheets, and the system permits the setting of a plural number of functions for each original sheet, the setting of functions in combination for each area, and the areas to be specified are a rectangular area with two points specified therefor and a point with one point specified therefor.

The image composition function consists in the function for copying the base original in color in four cycles, and then, holding the paper on tile transfer device, continuing to copy again the trimmed original sheet in four cycles, and thereafter outputting the copy. The copy-on-copy function consists in the function for copying the first original in four cycles, and then, holding the paper on the transfer device, continuing again to copy the second original sheet in four cycles, and thereafter outputting the copy.

The color composition function consists in the function for copying the first original sheet in magenta, and, holding the paper on the transfer device, continuing to copy again the second original sheet in cyan, and then, holding the paper on the transfer device, continuing further to copy the third original sheet in yellow, and thereafter outputting the copy. In the case of the four-color composition, the copying process is performed again further to add black onto the copy, and then the copy is output from the system. The partial image shift function consists in performing the copying process in color in four cycles and then, holding the paper on the transfer device, continuing to copying again in four cycles, and thereafter outputting the copy.

In the full-color mode as a part of the color mode, the copying process is performed in four cycles. In the three-color mode, the copying process is performed in three cycles unless the editing mode is turned on. In the black mode, the copying process is performed in one cycle except for the case where the editing mode is turned on. In the plus-one-color mode, the copying process is performed in one to three cycles.

In the tool pathway function, the system provides the audio-tone, machine set-up, default selection color registration, film-type registration, color collection, presetting, film projector scanning area correction, audio-tone, timer setting, billing meter, diagnostic mode, the maximum adjustment, and memory card formatting functions. For the setting and changing operations by this pathway function, it is required to input the appropriate cipher code. Otherwise, the system does not accept any attempt at putting this function into action. Therefore, it is the key operator and the customer engineer that can perform any setting operation or changing operation by the tool pathway. However, it is only the customer engineer that can enter into the diagnostic mode.

The color registration function is to be used for the registration of colors on the register color buttons on the color palette, and such registration is read by the CCD line sensor into the system from the color original sheet.

The color collection function is employed for making fine adjustments of the colors registered on the register color buttons. The film-type registration function is used for the registration of the registered film type which is to be used in the film projector mode, and in, in case such a film type has not yet been registered, the system will be in the state in which it is not possible to select any register button on the screen in the film projector mode. The presetting function performs the presetting of the reduction/enlargement values, the copy density in seven steps, the copy sharpness in seven steps, and the copying contrast in seven steps. The film projector scanning area correction function is used to making adjustments of the scanning area at the time the operation is performed in the film projector mode. The audio-tone function is put into action for making adjustments of the volume of the sounds used in the selecting operation. The timer-setting function is used for performing the setting of the time which can be released to the key operator.

In addition to these functions, the system also provides such functions for dealing with abnormal conditions in the system as the crash recovery function, which initiates a restart in case the sub-system falls into the state of a crash, the function for initiating the fault mode in case the sub-system cannot be restored to its normal state even though the crash recovery operation is performed two times, and the function of making an emergency stop in the event of the occurrence of a jam. Furthermore, it is possible also to use in combination the basic copying functions/the additional functions and the marker editing functions, the business editing functions, the creative editing functions.

This copying machine features enhanced operating facility with operations integrated in one place as much as possible, with the hardware buttons on the hardware control panel and the soft buttons on the soft panel on the CRT screen available for use side by side, so that the selection of the functions can be made directly in a manner easy for the beginners to understand and yet not troublesome to the highly skilled operators, and, at the same time, this machine has been designed to be capable of communicating the necessary information to the operator accurately through its effective utilization of colors. This copying machine has been so designed that its high-fidelity copying process is put into action only by operations at the hardware control panel and the primary screen (i.e. the opening menu screen) while the processes which cannot be regulated by the operational flow, such as start, stop, all clear, and insertion, are performed by the operations at the soft panel on the primary screen, but such operations as the selection of paper, size reduction and enlargement, copy density, picture quality adjustment, color mode, and color balance adjustment are put into action by operations on the soft panel on the primary screen, making it possible for the users of the conventional monochromatic copying machines to use this machine well enough in a manner natural to them. Furthermore, this machine is designed to allow the users to open the proper pathway and to select the various types of its functions, such as the editing functions, merely by touching operations at the pathway tabs in the pathway region on the soft panel. Furthermore, this machine permits the automatic execution of the predetermined operations. With the copying modes, the conditions for their execution, and so forth being stored in advance in the memory card.

With touching operations on the pathway tab for the pathway region on the soft panel, it is possible to open the pathway and to select the various types of editing functions. In the marker editing function, for example, it is possible to perform the editing and processing of documents in black and white using the tool called the marker, and, in the business editing function, high-quality original documents can be produced quickly mainly for use as business documents. Moreover, in the creative editing function, various types of editing functions with many choices are made available in such a manner that this copying machine will be able to satisfy the needs of various specialists, such as designers, copying service agents, and key operators. In addition, the area specified by the editing functions is put on display in the form of a bit map area, so that the specified area can be ascertained thereby. Thus, such abundant editing functions and color creation capabilities of this system make it possible to achieve very considerable enhancements of the power of expression in writings.

In case of a color CRT as a user interface (UI), as is the case with the present system, the amount of data will be increased because of the color displaying features as compared with the case where a monochromatic display is used, and also there will be an increase in the amount of data if it is attempted to construct a friendlier UI by incorporating therein contrivances regarding the composition of the display screen and the transition of the screens.

In dealing with such an increase in the amount of data, it will be possible to employ a CPU mounted with a memory device with a larger capacity, and yet such a step would result in using a larger board, which will present such problems as the difficulty in accommodating it in the main unit of the copying machine, the difficulty in taking flexible measures for dealing with the changes in the specifications, and a resulting increase in the costs. Therefore, it has been designed, with respect to this copying machine, to deal adequately with such an increase in the amount of the data by setting up separate CPU's as remote units, embodying therein those techniques which can be used in common with other models or machines, such as the CRT controller. For further details of the control of the machine illustrated in FIG. 1, reference is made to U.S. Pat. No. 5,032,903 incorporated herein.

With reference to FIG. 2, there is shown a remote communication system including remote host 157 interconnected to Control 71 of machine 30 through a suitable channel such as telephone line 175 or such as local and wide area networks, cellular phone channels, infrared links, and serial channels such as RS232 and SCSI. Selected machine features as will be described below are downloaded or, if already resident in the Control 71 of machine 30, are enabled by communicating with a suitable memory or storage, such as features file 194 within Control 71. It should be noted that the scope of the invention is intended to cover any suitable method to reconfigure machine 30. The reconfiguration can be initiated remotely from site 157 by downloading features to be stored in memory and setting appropriate flags, such as in NVM 167, to designate features. An alternate embodiment provides that the machine 30 operator logs into the remote (central) host, determines options or features that can be loaded, and selects those options or features to be downloaded. In this scenario, the remote host would likely be 'unmanned' and would merely update it's billing and configuration databases to reflect the change on machine 30.

A communication modem 182 is provided for machine 30 at the machine site, modem 182 serving to connect line 175 to machine 30 for transmittal of the machine physical data from machine 30 to the remote host 157 and reconfiguration data from remote host 157 to machine 30. A computer such as PC 159 with suitable input such as keyboard 180 is provided at the remote host 157 for use in establishing communication with modem 182 for transmission of data from machine 30 via line 175 to host 157 and from 157 to machine 30. A suitable data bandwidth converter 184 converts data to the clock rate required for transmission over line 175, it being understood that the rate at which data is handled by machine 30 is ordinarily different and typically substantially greater that the data transmission rate of telephone line 175. In this regard a clock 195 is connected to converter 184. The clock 195 is used to determine frequency of testing the state of the machine, for possible transfer of an alert.

Figure 3:
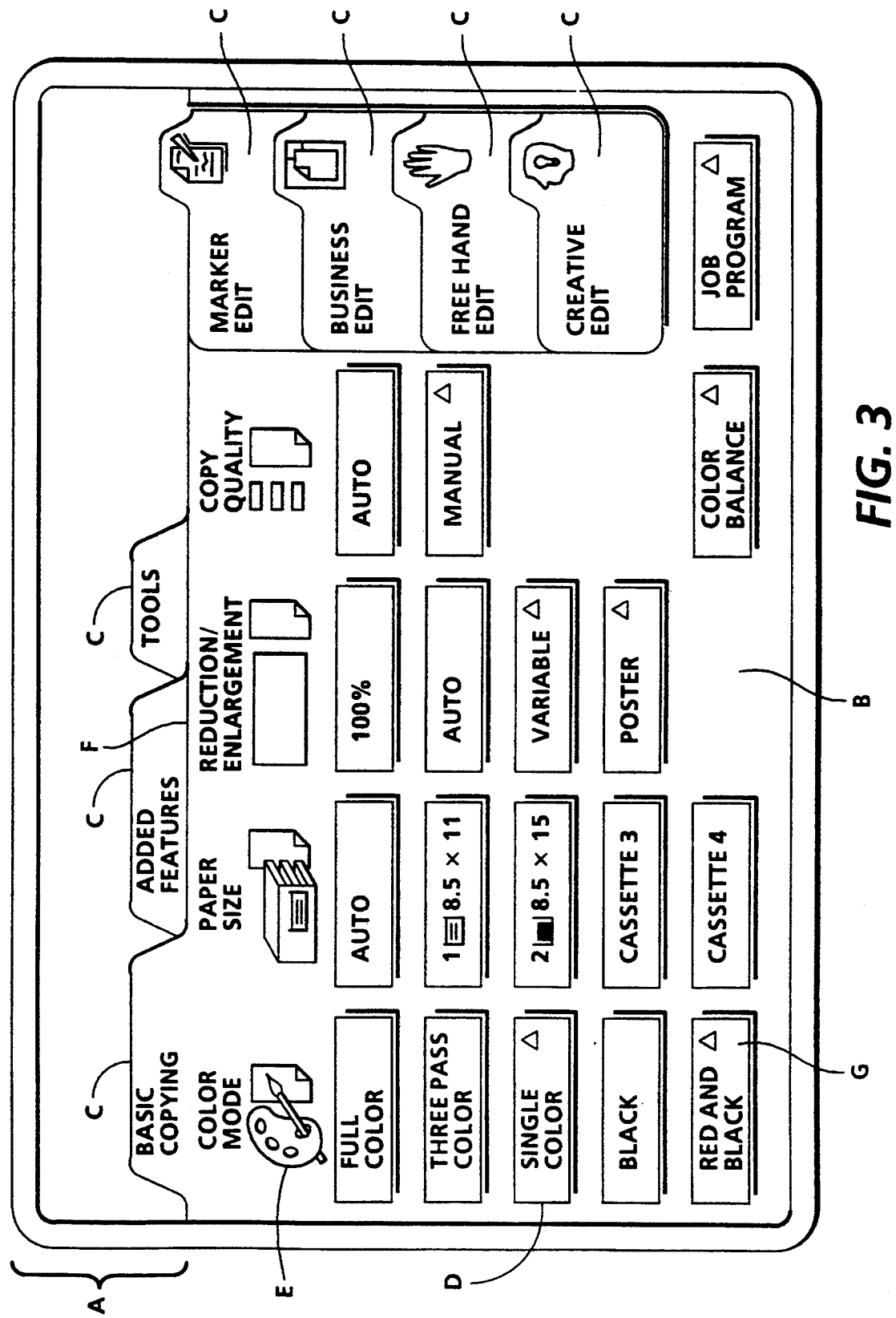
FIG. 3-5 are front views of the touch monitor screen of the machine of FIG. 1 the machine depicting touch selection icons.
Figure 4:
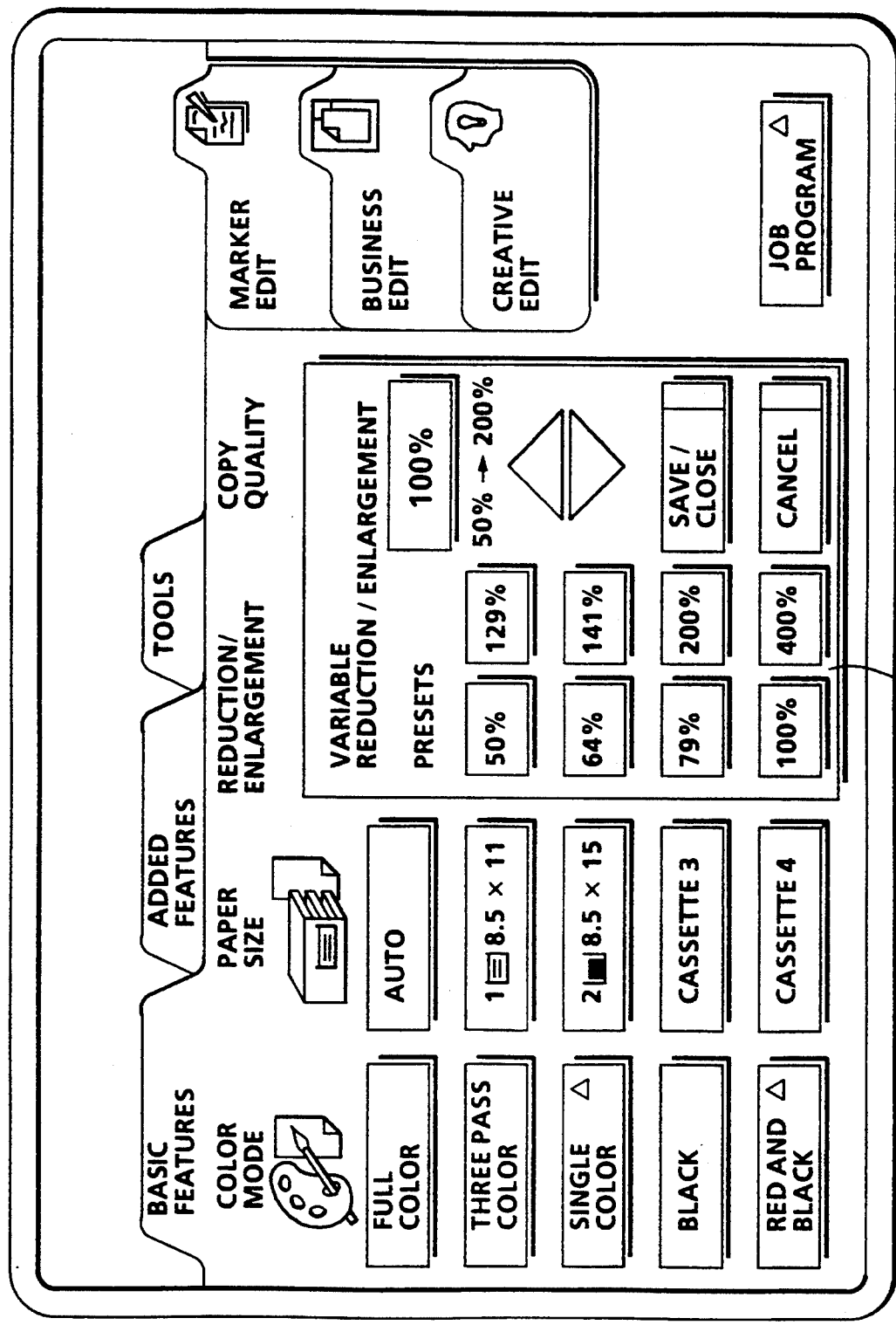
Figure 5:
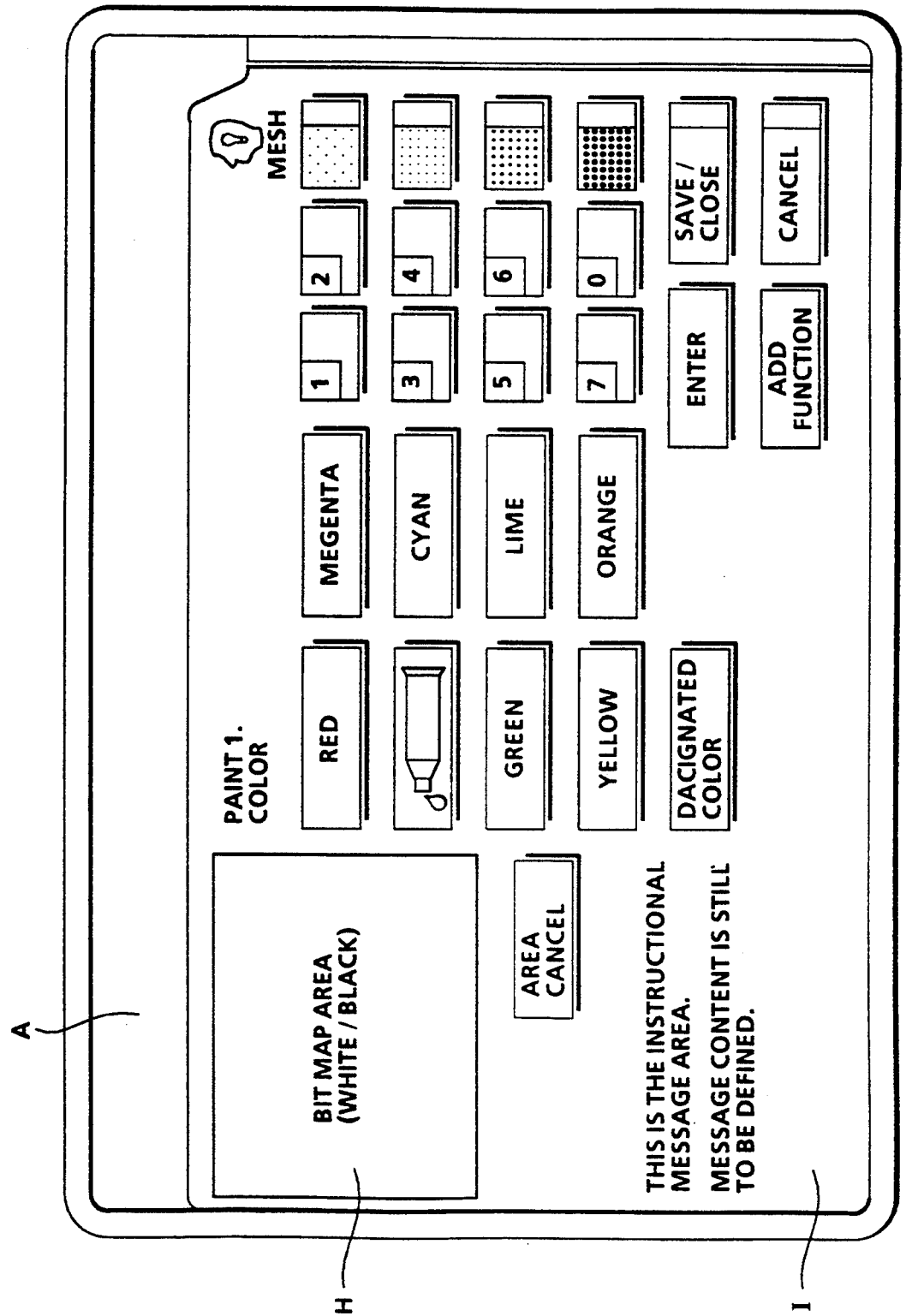

FIG. 3 illustrates the basic user interface screen of machine 30 while FIG. 4 shows an example of the pop-up screens put on display on the basic copying screen, and FIG. 6 shows by way of example the screen for Paint 1 for the creative editing process. The basic copying mode screen which is used for setting the copying modes, is put on display as the initial menu screen. The screen for setting the copying modes forms a "soft" control panel, which is a screen divided into two parts, i.e. between the message area A and the pathway B, as shown in FIG. 3. These screens illustrate the basic frames or displays of currently available options or features for an operator to run a job requirement.

The message area A occupies the area equivalent to three lines in the uppermost area on the screen, the first line being used for the state message and the second line and the third line forming an area for use for guiding messages in case there is any contradiction in the selection of the functions, for use for messages concerning any abnormal state of the equipment, and for use for messages representing warning information, and the prescribed messages are put on display in this area. Moreover, the right-hand margin of the message area A is assigned to the area for indicating the number of sheets, and here the set number of sheets to be copied as input with the ten keys and the number of copies being produced are indicated.

The pathway B constitutes the area where selection is to be made of various kinds of functions, and it has the pathways of basic copying, editing features, marker editing, business editing, free-hand editing, creative editing, and tools, and, in correspondence to each of these individual pathways, the pathway tabs C are put on display. Additionally, each of the pathways is provided with pop-up menus for improving the operating ease and efficiency. In the pathway B, the system puts on display the "soft" button D, which forms a list of branched choices, with which selection is to be made of the functions by touching on the appropriate button, the icon E (picture), which changes, depending on the selected function, and represents the specific function, the indicator F, which indicates the reduction/enlargement ratio, and so forth. Those functions which are shown on the pop-up menus by operations on the "soft" buttons are indicated by the pop-up mark G [triangle mark]. And, by touching on the pathway tab C, the pathway can be opened, and the functions of the particular pathway can be selected by touching on the soft button. The selection of functions by touches on the soft buttons is so designed in consideration of its operating efficiency that the operation are to be performed from the upper left part of the screen towards the lower right-hand side thereof in regular steps.

As mentioned, the display/system features the division between the basic copying screen and the rest of the screens in order to provide the maximum compatibility with the other models of equipment and the maximum compatibility with the hardware console panel, and the editing screen, moreover, is designed to have a hierarchical structure composed of a plural number of levels so as to offer screens and functions in a manner suitable for the operator's skill level. Furthermore, this system offers a set of screens enabling the operator to use the functions with ease in a highly variegated way with the advantage of the pop-up representation of high-level functions and complicated functions among those presented on a given single screen through the combination of the screen composition as described so far and the pop-up functions.

The pop-ups contain detailed information for the setting of particular functions, and the composition for the screen for each pathway is made easy to observe and simple by providing the pop-up opening function and by having the detailed function-setting information as required from time to time. The pop-up menu is opened when a soft button with a pop-up mark thereon is touched. And, the pop-up menu is closed, for instance, when a close button or a cancel button is selected, or when the "all-clear" button is selected, or when the "all-clear" button is pushed, or when the "all-clear" operation is put into action by the auto-clear function. It is FIG. 4 that shows the appearance of the screen where a pop-up is opened by a touch on the soft button for variable magnification in the reduction/enlargement function.

The pathway for the basic copying function is provided with soft buttons (i.e. branched choices) for the selection of the individual functions for the color mode, paper selection, reduction and enlargement, copy quality, color balance, and job program, as illustrated in FIG. 3 and is also provided with the individual pathway tabs for marker editing, business editing, free-hand editing, and creative editing, as well as aided features and tools. These pathways are the initial-phase pathways, which are put on display, for example, after the power-on operation or after turning on the all-clear button, or when the auto-clear button is turned on.

The color mode is provided with the branched choices of full-color copying (four path color) for copying in the four kinds of color, Y, M, C, and K, three path color for copying with toners in the three kinds of color excluding K, single-color copying, which offers the choice of one color out of 12 colors, black and black/red, and the default choice, which is selected automatically, is designed to permit its voluntary setting. Here, as the choices for black/red has detailed items to be set, those items are developed on the pop-up menu.

The selection of paper offers the four choices of automatic paper selection (APS), trays 1 and 2, and cassettes 3 and 4, and the APS works when a specific magnification is set for reduction or enlargement, but does not work when the automatic magnification system (AMS) remains set. The default setting is for the APS.

The reduction and enlargement function permits the choices of 100-percent reproduction, the AMS, which is to be used for setting the magnification for copying on the basis of the paper size and original sheet size when the paper size is selected, and the voluntarily chosen magnification, and puts the set magnification, the computer magnification, or the automatic setting on display on the indicator in the top area of the equipment. For the variable magnifications, this system permits the setting of magnification by one percent in the range from 50% to 400% as shown in FIG. 4 and also permits the setting of the vertical magnification and the horizontal magnification independently of each other (differential magnification). Therefore, the detailed setting items for these are developed on the pop-up menu. Moreover, the default magnification setting is 100 percent.

As mentioned, this reduction and enlargement process is performed by changing the scanning speed for the subsidiary scanning direction (i.e. in the X-axis direction) and through reduction or enlargement in the main scanning direction (i.e. in the Y-axis direction) by a change in the manner of reading the signals out of the line memory for the IPS. The copy quality function offers the choices of the automatic processes by which the system forms density control for original sheets in black and white and performs automatic color balancing for color original sheets and the manual processes by which the system permits the operator to perform density control in seven steps with the pop-up menu, and the IPS performs control over these processes. The color balancing function enables the operator to specify the color to be reduced on the copy out of Y, M, C, B, G, and R by operations with the pop-up menu, and the IPS performs control over the process.

The job programming function offers branched choices that work effectively only while a memory card remains inserted in the slot of the reading device thereof, and, in this mode, it is possible to select the reading of the job data from the memory card, as well as the writing of such data to the memory card, by operations on the pop-up menu. As for the memory card, this system uses, for example, a memory card with the memory capacity of 32 k-bytes, with which the system is capable of performing the programming of all the jobs except for those in the film projector mode.

The pathway for the aided features is provided with soft buttons (i.e. branched choices) for the selection of the individual functions for copy output, copy sharpness, copy contrast, copy position, film projector, page programming, job programming, and binding margins and it is also provided with the pathway tabs for marker editing, business editing, free-hand editing, creative editing, and, in addition, basic copying and tools. The copy output pathway offers the branched choices between the output of the copied paper to the top tray and the output of such paper in the sorting mode. The copy contrast pathway offers the choices of control over copy contrast in seven steps. The copying position function provides the default choice of the automatic centering function, which position the center of the copied image in the center of the paper.

The page programming pathway gives access to the branched choices of the covering function, which puts cover on the copies, the inserting function, which inserts white paper or color paper between copies, the color mode, which sets the color mode for each page of the original sheets, the tray selecting function, by which the tray can be selected for each page of the original sheet. In this regard, this item will not be put on display unless the ADF is installed.

The binding margin pathway makes it possible to specify the binding margin by 1 mm in the range from 0 to 30 mm, and the said margin can be set only in one position for one original sheet. The amount of the binding margin is the amount of space from the top edge of the paper to the top edge of the image area, and the main scanning direction is set by shifting operations by means of the line buffer in the IPS and by a lag in the scanning timing of the IIT in the subsidiary scanning direction.

The editing screens are offered through the four pathways, which are marker editing, business editing, free-hand editing, and creative editing. The marker editing pathway and the free-hand editing pathway provide the branched choices of the various individual functions relating to the extraction, deletion, color application (mesh/line/solid), and color change, and further have the pathway tabs for basic copying, aided feature, and tools. The business editing pathway provides the branched choices of the individual functions relating to extraction, deletion, color application (mesh/line/solid), color change, color painting, logogram insertion, and binding margin, and has the pathway tabs for basic copying, aided features, and tools in the same way as the marker editing pathway, etc.

The creative editing pathway offers the branched choices of the individual functions relating to extraction, deletion, color application (mesh/line/solid), color change, color painting, logogram insertion, binding margin, negative-positive reversal, image setting and synthesis, openwork synthesis, painting, mirror image formation, repeating, enlargement and continuous copying, partial shifting, corner/center shifting, manual/automatic variable magnification, color mode, color balance control, continuous page copying, and chromatic synthesis and furthermore has the pathway tabs for basic copying, aided features, and tools as is the case with the marker editing pathway, etc.

Software upgrades in reproduction machines and printers may contain both problem fixes as well as new functionality. In the past, the upgrade process has often been done by on site personnel at a considerable expense and and loss of time both to the service personnel as well as the customer. In accordance with the present invention, customers can load the software from a remote host and have immediate access to all the features that were available on the machine prior to the upgrade. Access to the new upgrade features is enabled through a remote interface communication interface.

Specifically, customers use the remote interface to request downloading of passwords or of codes to the system or remote host The remote host then enables the new features with the appropriate instructions and data communications over the shared communication line. The order of the process can also be that the enabling of new features through the remote interface communication could be initiated by the customer before the new software is loaded and stored in the specific machine. The new features would then be immediately enabled upon completion of the software upgrade. It should be noted that all passwords and codes could be generated and downloaded from the remote central station.

The enablement of machine features from a remote station is also applicable to new installations of a machine. Since a given machine contains many features, some of which may or may not applicable to the customer needs, the machine can be installed and the suitable features enabled remotely. As a customer desires to add features or even to delete some existing features, these features can also be enabled from the remote station after a suitable request from the customer. It should be noted that for many features, the specific feature is already resident in the machine software and control. Enablement of the feature may simple mean setting a suitable flag in memory to trigger the availability of the feature, such as the appropriate messages and screen displays to prompt the operator. In other situations, it may be necessary to completely download the appropriate software or control code into the machine including the appropriate software for displays and operator prompts before the feature can be enabled.

It should be noted that upgrades and changes to the features of machine 30 can be provided directly from the machine 30 location. An operator using the machine 30 interface simply logs into the remote host system for a display or listing of options and features available to machine 30. These options or features may already be resident in machine 30 or may have to be downloaded to machine 30. In either case, the operator merely selects the desired options or features and the remote host automatically activates the feature if resident is machine 30 or downloads the feature to machine 30 and then activates the feature. The remote host records the new configuration of machine 30 for purposes such as billing and monitoring. It should also be noted that in addition to features, other information such as diagnostic routines, test routines, and service procedures can be downloaded to a given machine.

The essence of the present invention is that either predetermined functions are downloaded or data and information to enable the predetermined functions are activated from the remote host for a specified remote machine. This can be initiated at either the machine 30 or the remote host. A typical scenario would be to identify a given machine at the remote host, identify the functions existing on said given machine, and selectively enable or disable specified functions for that given machine.

FIG. 6 illustrates the screen 163 display at remote host 157 of functions currently available on machine xx. The window 101 displays functions that are not on machine xx that could be downloaded to machine xx or that are already resident on machine xx and can be enabled. For example as shown in FIG. 6, the market edit, freehand edit, and creative edit functions are illustrated. It should be understood that there are many ways to display or list the functions available on a given machine and those that can be downloaded or made available on a given machine and FIG. 6 is merely exemplary. For example, the display or listing for selection could be done at machine xx. Having an identified machine xx, the various selected functions could be simply identified by engaging the buttons 106, 108, and 1010 and this information suitably transferred via the telephone line to machine xx.

A typical sequence would be for an operator at the remote station or at machine xx to enter a feature enable mode and enter a particular machine identification number. There would also be required a suitable log on procedure with an appropriate password. It should be understood that there are various methods of secure log on such as a general password to have access to the feature enablement mode. Another method would be to require a unique password for each machine and require a unique log on password for each machine. Once the operator has suitably logged on, has identified a specific machine with a specific ID, a sequence of enablement and disenablement steps can be followed. In one embodiment, for the given machine there could be a listing or display of features currently in the machine. This would give the operator a chance to disable any of these given features that are no longer desirable for the specific machine.

Next there could be a display or listing of features that are not currently enable in the machine. This includes a verification that the machine in fact has a capability to run the feature. The operator then selects the features to be either downloaded to the machine or enabled in the machine by suitable selection either through soft buttons or other switches to transmit this information over the communication channel. The necessary software would either be downloaded to the machine and suitably stored in memory or if already resident in memory an appropriate flag would be set in memory, preferable a non-volatile memory to identify to the machine control that in fact this feature had been enabled. It should be noted that various prompts and messages can be suitably displayed at the central station to prompt the operator for any given machine. In addition, it should be noted that the displays of features available and that can be enabled will vary from machine to machine.

It should be understood that the scope of the invention is intended to encompass the remote enablement of features in predetermined machines using telephone line, dedicated communications channel, or any other manner of remote communication. It should also be understood that there are many various methods of identifying the machines in communication with the central station and listing and identifying existing features and potential features such as any suitable lists, tables, displays including icons and codes to suitably identify a machine an appropriately enable features or disabled features.

Again, with reference to FIG. 6, to illustrate one scenario for the practice of the present invention, there is shown screen 163 at site 157 displaying a simplified version of machine functions relating to machine xx such as full color, black, and single color under the color mode column, auto paper size, tray 1, and tray 2 under the paper selection column, and automatic R/E, 100%, and variable R/E under the reduction/enlargement column. These functions represent enabled functions for machine xx or any other selected machine interconnected to site 157. Functions not in machine xx or not enabled are displayed in phantom as illustrated at 101, for example, the marker edit, the business edit, and creative edit functions. It is assumed that these marker, business, freehand, creative edit functions and any other suitable function are either already available in the machine control as operator functions and need only be enabled or are not resident within the machine control 71 and must be downloaded to the machine and then separately enabled.

It should be noted that, in the particular embodiment being described, there are three functions that may or may not be made available However, it should be understood that the invention extends to any number of functions as well as types of functions that could be selectively be made available to the operator on the user interface screen.

In operation, there is a memory configuration table of flag indicators in the PC 159 to identify which particular features are available and to initiate the display of these particular features on the screen 163 for a particular machine. Assuming that none of the editing features are available as illustrated by the space 101, and that it is desired to install or enable a selected set of these editing features, the PC 159 control provides a pop up window or frame 105 as shown in FIG. 7. The pop up frame 105, for illustrative purposes includes only the marker edit function 106, the freehand edit 108, and the creative edit function 110 and includes the appropriate text message to press button to enable or install the features. These are the features to be conveyed to the features file 194 or any other suitable memory of machine xx. As a particular edit function button is engaged, that particular feature is downloaded and/or enabled in features file 194.

For example, with reference to FIG. 8, there is illustrated the sequence of the operator pressing the marker edit button 106 to move the marker edit function 106a to the screen desktop. In effect, the PC 159 control is noting in a configuration table in memory that the marker edit function has been conveyed to machine xx or enabled for machine xx and the machine now includes the marker edit feature. Thus, upon machine start up of machine xx, the marker edit function will be available.

With reference to FIG. 9, there illustrated a flowchart of a typical scenario for implementing the present invention. In particular, at block 302 there is shown the step of enabling the feature download mode. As stated above, this could be either to merely enable a feature already installed in a remote machine or may in fact be the downloading of the software to provide the feature in the remote machine control and the subsequent enablement of that feature. To change the features for a machine from the remote site 157, the operator at the remote site must validate a network password as shown at block 304. This could be a blanket password for the operator to have access to any machine on the network or in fact may be a machine specific password to access a specific machine on the network.

At 306, the operator designates a specific machine, and at decision block 308 there is a determination as to whether or not the designated machine is a legitimate machine. That is, is the machine an appropriate machine to have features enable or disabled from the remote site 157. If the machine is not legitimate as illustrated at 308, the operator at the remote site 157 can only continue by designating another machine. If the machine is a legitimate machine, the operator will then select features to be enabled or disabled as shown at 310. It should also be understood that at this time the operator could optionally select whether certain features are already installed in the designated machine and merely to be enabled or select whether or not the feature itself must be downloaded to the machine to be enabled. Also, the operator can disengage or disable features already enabled in machine xx.

At block 312 there is a determination whether or not the feature changes are valid, that is, this could include a determination as to whether or not the configuration of the machine allows or does not allow for designated features. Various other options could also be made available to the operator, such as only making available or displaying features that are in fact compatible with the designated machine so that there is no chance of an operator selecting a non-compatible feature. If the feature changes are not valid or compatible, then the operator must then select new features as shown at 310.

If the feature changes are valid, at 316 the operator makes the changes which are stored in a suitable memory in PC 159 at the remote site 157. These new features will then appear on the list of available features or features already enabled for the designated machine when such machine is designated at a future date. After the changes are made and stored, it is also assumed that the changes are stored in suitable memory in the designated machine such as non-volatile memory to be scanned by the control and implemented during the operation of the machine. Block 318 illustrates existing the feature download mode and the return to any suitable start up frame on screen 163 of PC 159. It should be noted that a similar scenario could be followed for feature changes, initiated by the operator at machine xx.

While the invention has been described with reference to the structure disclosed, it is not confined to the details set forth, but is intended to cover such modifications or changes as may come within the scope of the following claims.

We claim:

1. In an imaging system having a control for producing images of documents provided with editing indicia on image supporting substrates, the system including a machine having a plurality of operating components and a central station remote from the machine, the machine and the central station being interconnected by a communication channel, the machine having a plurality of predetermined activated editing features available to a machine operator, a method for activating an editing feature different from said activated features, the editing feature being previously inactive and unavailable to a machine operator, the editing feature providing changes of original images to the images on the supporting substrates in response to the editing indicia, including the steps of identifying the machine at the central station for having said additional editing feature enabled, communicating with the machine over the communication channel interconnecting the machine and the central station, responding at the machine that said additional editing feature is a valid feature for said machine, enabling from the central station said additional editing feature for the machine, said additional editing feature becoming an activated feature available to a machine operator, and recording in memory the activation of said additional feature.

2. The method of claim 1 wherein the step of recording in memory the activation of said additional feature includes the step of recording a central station memory.

3. The method of claim 1 wherein the step of recording in memory the activation of said additional feature includes the step of recording in a machine non-volatile memory.

4. The method of claim 1 wherein the step of communicating with the machine over the communication channel includes the step of logging on the communication channel with a password.

5. The method of claim 1 wherein the step of identifying the machine at the central station for having said additional feature enabled includes the step of entering a features enabling mode.

6. The method of claim 1 wherein the editing features include trimming, color mesh, and black to color functions.

7. In an imaging machine for producing images of original documents on image supporting substrates, the machine having a plurality of operating components, including an operator interface, a central station remote from the machine, the machine and the central station being interconnected by a communication channel, the machine having a plurality of predetermined activated editing features available to a operator, including trimming, color mesh, and black to color functions providing selected changes of the original document on the supporting substrates a method for enabling an additional feature different from said activated features, the additional feature being unavailable to operator until said enabling, at the operator interface including the steps of:

identifying at the operator interface said additional feature to be enabled, communicating with central station over the communication channel interconnecting the machine and the central station, determining that said additional feature is a valid feature for said machine, enabling said additional feature for availability to he operator for the machine, and recording in memory the activation of said additional feature.

8. The method of claim 7 wherein the step of recording in memory the activation of said additional feature includes the steps of recording in a central station memory.

9. The method of claim 7 wherein the step of recording in memory the activation of said additional feature includes the step of recording in a machine memory.

10. The method of claim 7 wherein the step of communicating with the machine over the communication channel includes the step of logging on the communication channel with a password.

11. In an imaging system for producing images of original documents on image supporting substrates, the system including a machine having an interface with display and a central station remote from the machine, the machine and the central station being interconnected by a communication channel, the machine having a plurality of predetermined activated features available to an operator, a method for changing said activated features including the steps of accessing the central station from the interface, displaying editing feature options at the interface, the editing features providing changes of the original document to the images on the supporting substrates, selecting a given editing feature option, responding that said editing feature option is a valid feature for said machine, enabling from the central station said editing feature for the machine, said editing feature becoming an activated feature, said editing feature previously being unavailable to the operator, and recording in memory the activation of said editing feature.

12. The method of claim 11 including the step of sequentially displaying feature options and select buttons.

13. The method of claim 11 including the step of de-selecting displayed features.

14. The method of claim 11 including the step of downloading diagnostic routines from the central station to the machine.

15. The method of claim 14 including the step of downloading service procedures.

* * * * *